Nov. 11, 1952 — E. M. DAVIS — 2,617,145
POULTRY PICKER
Filed April 15, 1949
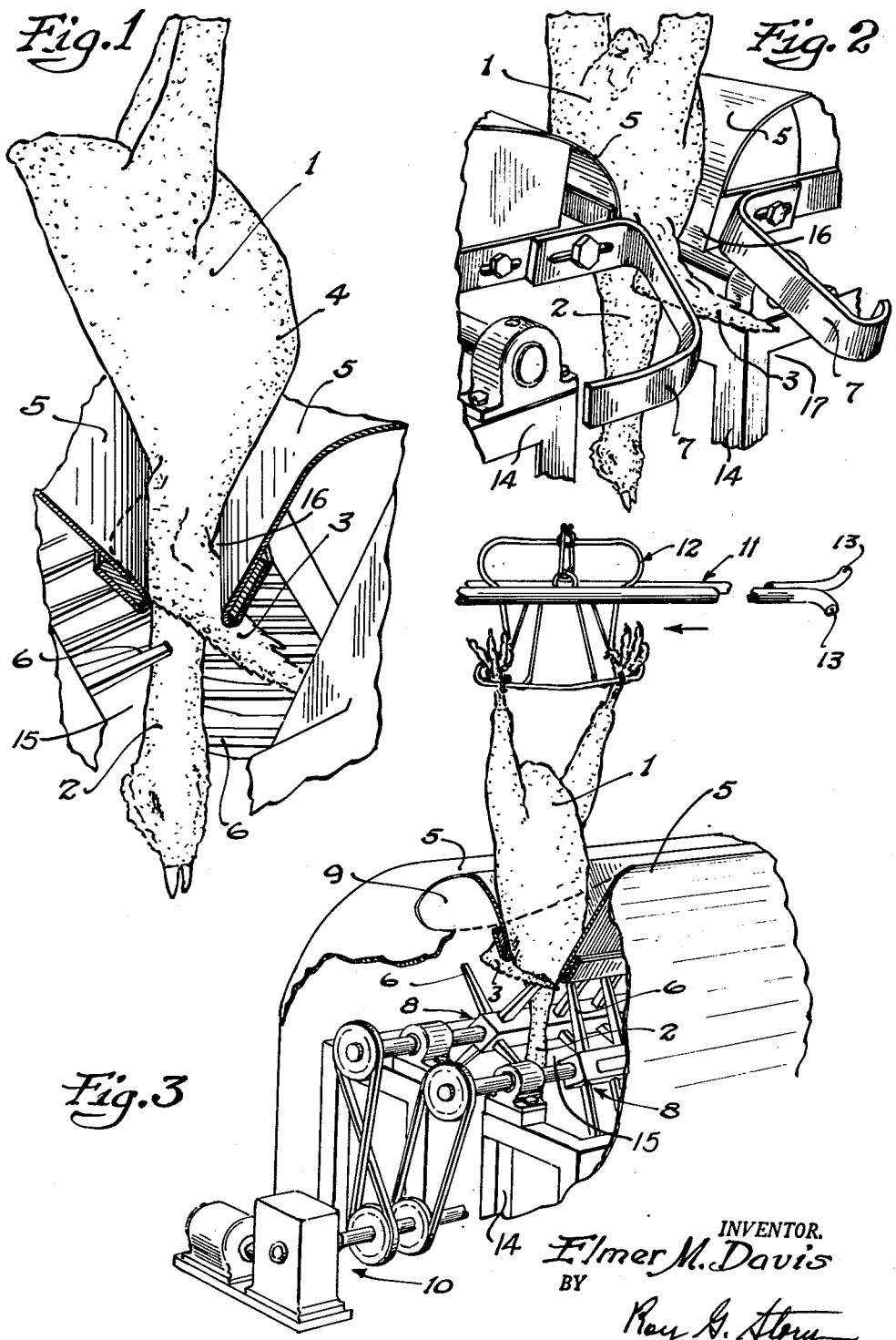
INVENTOR.
Elmer M. Davis
BY
Roy G. Story
ATTORNEY Patented Nov. 11, 1952

2,617,145

UNITED STATES PATENT OFFICE 2,617,145

POULTRY PICKER

Elmer M. Davis, St. Croix Falls, Wis., assignor to Swift & Company, Chicago, Ill., a corporation of Illinois Application April 15, 1949, Serial No. 87,785

3 Claims. (Cl. 17—11.1)

This invention relates to a poultry picking machine and more particularly to an improved poultry picking machine especially adapted for stripping the necks and wings of a poultry product.

Many types of poultry picking machines have been devised in the past to speed up and mechanize the one-time hand operation of plucking the feathers from poultry. As the art developed, it became apparent that no one machine could satisfactorily remove all of the features from all parts of each bird plucked. Each machine-picked bird required more or less hand picking in order to produce a product which could be regarded as satisfactory. The natural outgrowth of this deficiency has been the development of specialized machines—body pickers, wing strippers, neck strippers, and the like.

It has been found that, as a matter of practical operation, even the specialized poultry picking machines fail to perform a completely satisfactory job. This has been found to be especially true with regard to so-called neck and wing stripping machines. Generally, the operations of removing the feathers from the necks and wings of poultry are carried out in two separate machines following the passage of the poultry through a body picking machine. The primary reason for such specialization has been that when attempting to remove the feathers from both the neck and the wings of a picked bird in a single machine, the defeathered breast of the bird has been barked and bruised by the picking fingers to a highly unsatisfactory degree.

It is therefore an object of this invention to provide a method and means for stripping feathers and the like from both the necks and wings of poultry in one operation.

An additional object of this invention is to provide a method and machine which will strip feathers or the like from both the neck and wings of a bird without barking or bruising the breast thereof.

Additional objects, if not specifically pointed out herein, will be apparent to one skilled in the art from the following detailed description of this invention.

Generally, this invention comprises a poultry picking machine especially adapted to complete the picking of the necks and wings of poultry while at the same time preventing any bruising or barking of the breasts of said poultry.

More specifically, the machine comprises a rotary picking means having flexible picking fingers affixed thereto, guard means so mounted above the picking means as to substantially enclose the upper portions thereof and to leave a narrow opening communicating therewith, and an overhead guide means adapted to orient poultry supporting members carried by an overhead conveyor into a particular position so that the poultry is always presented to the picking fingers in the same manner.

In the drawings:

Figure 1 is a sectional view of the machine taken at any point between the entrance end of the machine disclosed in Fig. 2 and the exit end of the machine disclosed in Fig. 3, showing a bird passing therethrough in plucking position.

Figure 2 illustrates the entry of a bird into the machine.

Figure 3 discloses the exit end of the machine and in addition illustrates the overhead guide means adapted to orient the poultry supporting shackles in a sidewards position.

Referring to Figure 1, numeral 1 represents a typical chicken or the like having a neck 2, wings 3, and breast 4. The bird is illustrated in plucking position with its wings and neck extending downwardly between guard means 5. Numeral 6 represents the flexible picking fingers of the machine.

In Figure 2 the guard means 5 are more clearly illustrated. In general, they comprise a pair of curved, elongated shields made of metal or other suitable material, as shown herein, which may or may not be detachable and are so mounted on the frame 14 as to substantially enclose the upper portion of the rotary picking means, leaving a narrow passage or opening 16 between the said shields extending longitudinally above the picking means and communicating with the picking zone 15 between the rotating picking means. Also shown in Figure 2 are guide members 7 which are preferably used in conjunction with the guard means 5 to ensure the wings 3 of the poultry being forced under the said guard means 5 as the suspended poultry is conveyed into the open end of the frame 14.

In Figure 3, the bird 1 is shown approaching the exit end of the machine. Shown in this view are the curved guard means 5, the rotary picking means 8 having flexible picking fingers 6 mounted thereon, discharge opening 9 through which the bird leaves the machine, driving means 10 for the rotating picking means 8, and also the overhead guide means 11 shown as a pair of parallel rails or the like closely spaced in a horizontal plane so as to retain the poultry supporting shackle 12 in a sidewards position therebetween. 13 indicates the curved ends of the said guide means which cooperate to turn the shackle so that it will pass sidewardly into the guide means.

In operation, the improved poultry picking machine of this invention functions as follows:

The poultry to be picked are suspended head downwardly from an overhead conveyor (not shown in the drawings) by a poultry shackle 12. Such shackles are common to the art and any conventional shackle may be so used for the purpose of this invention. The birds so suspended have generally been first passed through a conventional picking machine to remove the feathers from the body portions thereof. This removes the feathers from the bodies and breasts of the birds and may loosen to some extent the feathers on the wings and necks. It is to protect the defeathered breasts of such birds during the neck and wing stripping operation that the present invention has been directed. As the suspended poultry approach the machine of this invention, which is positioned directly beneath the path of travel of the overhead conveyor, the shackles contact the outwardly flared ends 13 of guide rails 11 and are oriented by said flared ends into such a position that the wings of the suspended poultry are presented to the picking fingers of the machine in a substantially flatwise manner as illustrated in the drawings. The poultry are now in such a position that as they near the entrance 17 to the machine the wings of the said poultry are contacted by guide means 7 of Figure 2 and forced downwardly under the edge of the shield-like guard member 5. Since the overhead guide means 11 extends at least the entire length of the machine and preferably a short distance beyond each end thereof, it will be readily apparent that once the wing of the bird to be picked is forced into the position shown in the drawings, i. e., beneath the edge of guard member 5, the relatively narrow space between the said guide rails 11 prevents any turning of the poultry supporting shackle and hence the bird is carried through the entire length of the machine in substantially the same position. The rotating picking means 8 rotate towards each other and hence, upon the fingers thereof engaging the neck and head of the bird, tend to held the neck stretched downwardly, thereby permitting good contact between the said neck and the said picking fingers. These picking fingers 6, which may be made of rubber or any other suitable flexible material, strip the feathers from that portion of the bird with which they are in contact. Through the provision of the guard members 5, it will be readily seen from the drawings that only the necks and wings of the poultry can be contacted by the said fingers. There is absolutely no possibility of any bruising or barking of the breasts due to contact with the picking fingers since the opening 16 defined by guard members 5 is too narrow to permit the breasts to pass therethrough. As the bird passes through the length of the machine, the flexible fingers completely strip the feathers from the exposed neck and wings, including even the small feathers on the edges of the wings. These latter have heretofore been of necessity removed by hand operation. The picked bird exits from the machine through discharge opening 9, as shown in Figure 3, and passes on, still attached to and propelled by the overhead conveyor, to whatever further processing operations remain to be performed.

The present invention is particularly applicable, although not so limited, to the finishing treatment of poultry carcasses which have been picked in one or more automatic picking machines. In such automatic machines, the body of the carcass is subjected to a plurality of picking operations with revolving drums containing picking fingers. Such operations may include one or more automatic machines, and the treatment may involve practices wherein the fingers apply the picking force with or against the lay of the feathers, or both, in sequence. The plucked carcasses are then subjected to the wing and neck stripping operation in accordance with the present invention wherein a different type of picking machine utilizing more rigid fingers may be used. It has been found that the most efficient operation is to conduct the wing and neck stripping operations after the regular body plucking has been completed. However, it is contemplated that such neck and wing picking may be performed first.

Although a metal shield has been shown in the drawings, it is to be understood that other protecting means may be used.

It is believed that it will be obvious to one skilled in the art from the foregoing description that the present invention constitutes a definite improvement over existing poultry neck and wing stripping machines.

I claim:

1. In a machine for picking the necks and wings of poultry, wherein the poultry is suspended head-downwardly by poultry shackles depending from an overhead conveyor and passed between a pair of laterally-disposed rotating picking means mounted within a frame open at the top and at least one end thereof, the combination comprising: curved guard members mounted on top of said frame above each of said rotating means, said guard members defining a relatively narrow, elongated, vertical opening between said guard members through which there is direct communication with the space between said picking means; guide members attached to said guard members at the open end of said frame; and overhead guide members extending parallel with said guard members and positioned at such a height above said guard members as to contact, position, and hold in parallel orientation with the long axis of said picking means the aforesaid poultry shackles depending from said overhead conveyor.

2. In a machine for picking the necks and wings of poultry suspended head-downwardly by poultry shackles depending from an overhead conveyor wherein the poultry are adapted to be passed between a pair of laterally-disposed, rotating picking means mounted within a frame open at the top and at least one end thereof, said picking means defining a longitudinal picking zone, the combination comprising: curved guard members mounted on top of said frame above each of said rotating means and defining a relatively narrow, elongated opening therebetween communicating directly with said picking zone; and a pair of guide members affixed to said guard members at the open end of said frame, said guide members extended outwardly and downwardly from said guard members.

3. In a machine for picking the necks and wings of poultry suspended head-downwardly by poultry shackles depending from an overhead conveyor wherein said poultry are adapted to be passed between a pair of laterally-disposed, rotating picking means mounted within a frame open at the top and at least one end thereof, said picking means defining a longitudinal picking zone therebetween, the combination comprising: curved guard members mounted on top of said frame above each of said rotating means, said guard members defining a relatively narrow, elongated, vertical opening communicating directly with said picking zone; a pair of guide members affixed to said guard members at the open end of said frame, said guide members extending outwardly and downwardly from said guard members; and overhead guide members extending parallel with said picking zone and positioned at such a height above said zone as to contact, position, and hold in a parallel orientation with said picking zone said poultry shackles depending from said overhead conveyor.

ELMER M. DAVIS.

REFERENCES CITED

The following references are of record in the file of this patent:

UNITED STATES PATENTS

| Number | Name | Date |
|---|---|---|
| 2,436,214 | Johnson | Feb. 17, 1948 |
| 2,469,345 | Toti et al. | May 3, 1949 |
| 2,479,775 | Porter | Aug. 23, 1949 |
| 2,512,843 | Tomlinson | June 27, 1950 |